July 1, 1941.  W. D. HALL  2,247,808
SURGE INDICATOR
Filed May 24, 1939  2 Sheets-Sheet 1
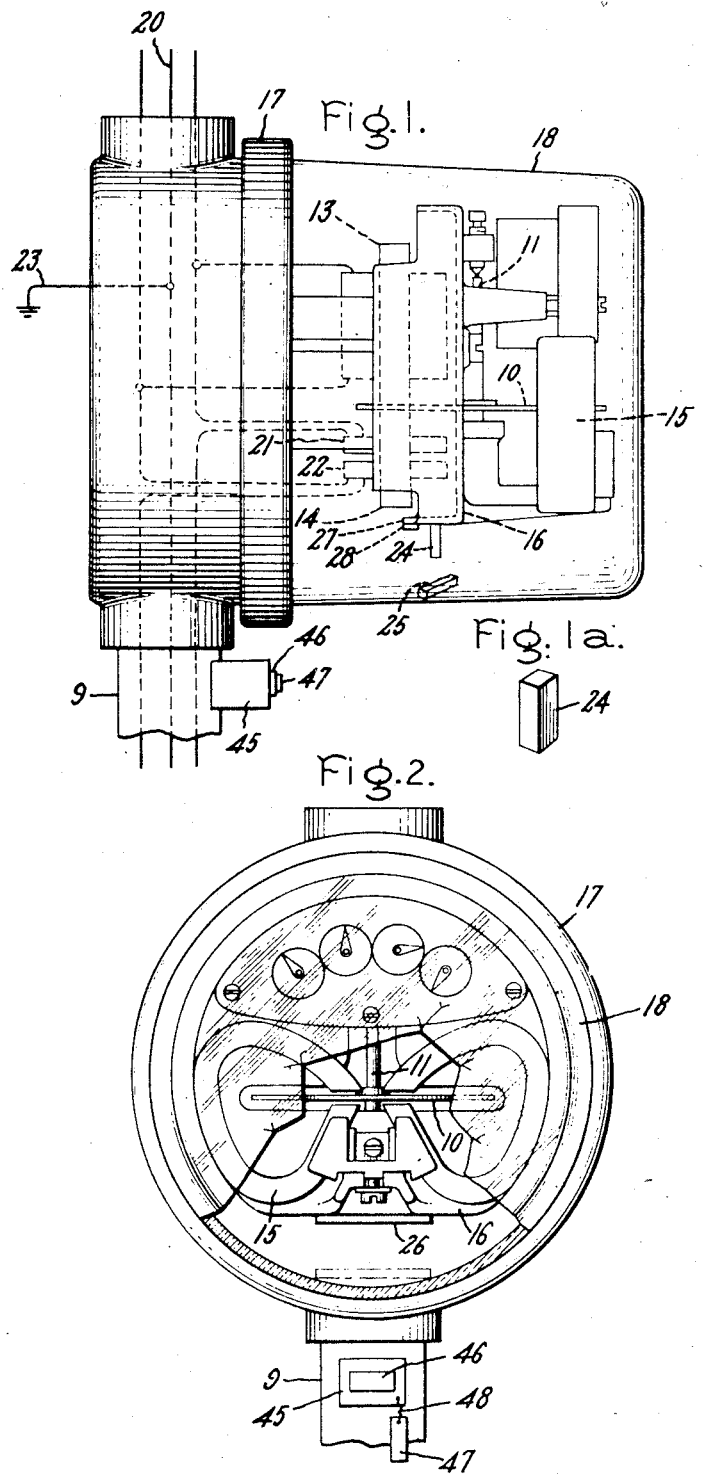
Inventor:
William D. Hall,
by Harry E. Dunham
His Attorney.

July 1, 1941.  W. D. HALL  2,247,808

SURGE INDICATOR

Filed May 24, 1939  2 Sheets-Sheet 2

Inventor:
William D. Hall,
by Harry E. Dunham
His Attorney.

Patented July 1, 1941

2,247,808

UNITED STATES PATENT OFFICE 2,247,808

SURGE INDICATOR

William D. Hall, Lynn, Mass., assignor to General Electric Company, a corporation of New York Application May 24, 1939, Serial No. 275,423

2 Claims. (Cl. 177—311)

My invention relates to surge current indicators and is particularly adapted for use in connection with metering devices such as watthour meters for the purpose of indicating that the meter has been subjected to a current surge of such value and character as to damage the meter, for example, to cause a change in the strength of the permanent damping magnets thereof, and that therefore the meter has become inaccurate.

In carrying my invention into effect I provide an indicator having a flux responsive actuator such as a small, inexpensive permanent magnet which is held by its own magnetism to some stationary magnetic structure in proximity to the cable or cables in which a surge may occur. In case a surge occurs of such character as to repel the permanent magnet from its seat or to demagnetize the permanent magnet to such value that it loses its holding power, it drops off and by so doing provides a permanent indication that the surge has occurred. The position, weight and thickness of the permanent magnet indicator can be varied to thus indicate the occurrence of a surge of approximately any predetermined value or character. The stationary magnetic support may comprise the permanent magnet and the indicator merely a small piece of magnetic material. Preferably, however, both the stationary and movable magnetic parts of the device are permanent magnets and the surge causes changes therein which change the magnetic force from one of attraction to one of repulsion. By providing two or more such devices of different strength or at different distances from the surge conductor, some may be operated while others are not operated and in this way an approximate value of the surge that has occurred may be determined. The device may even be used as a momentary overload indicator.

Figure 3:
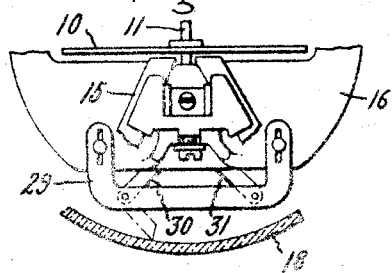
Figure 4:
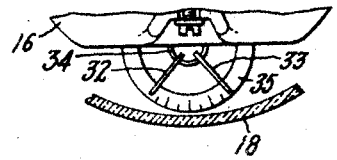
Figure 6:
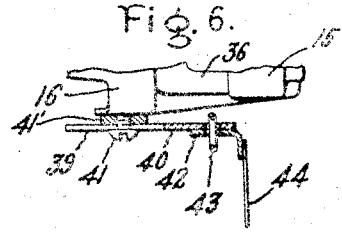
Figure 5:
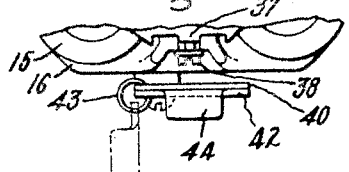
Figure 8:
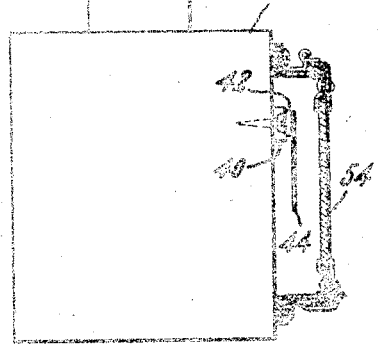
Figure 7:
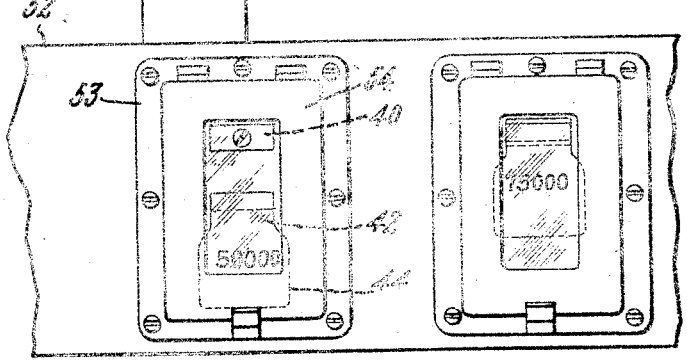

The features of my invention which are believed to be novel and patentable will be pointed out in the claims appended hereto. For a better understanding of my invention, reference is made in the following description to the accompanying drawings in which Fig. 1 represents a side view of the main elements of a watthour meter to which one form of my invention has been applied; Fig. 1a is a perspective view of one of the indicator magnets used in Fig. 1; Fig. 2 represents a face view of a similar watthour meter representing another form of my invention; Figs. 1 and 2 also show how the invention may be applied to the meter conduit; Figs. 3 and 4 are fragmentary views of a meter shield and other forms of the invention; Figs. 5 and 6 are front and side views of a portion of the drag magnet assembly of a watthour meter representing a preferred embodiment of my invention; Fig. 7 shows the application of my invention for indicating surges on transmission lines; and Fig. 8 is a partial view of Fig. 7 from the side thereof.

Referring to Fig. 1, I have indicated here some of the more essential parts of a watthour meter in approximately their normal relation. 10 represents the meter disk of conducting material, 11 its shaft, 13 the voltage electromagnet, 14 the current magnet, 15 the damping magnet and 16 a magnetic shield between the driving magnets 13 and 14 and the damping magnet 15. 17 indicates the base of the meter in outline and 18 the glass cover, 9 may represent a conduit containing the service wires to which the meter is connected. The wiring is represented as for a three-wire system having a neutral wire 20 and the meter has two current coils 21 and 22 connected to the other wires.

Occasionally the circuit in which watthour meters and other similar metering devices are connected receives serious surges. Sometimes these are caused by short circuit conditions but usually by lightning. When this happens, the current coil or coils may be momentarily subjected to several thousand amperes, or the surge current may occur in the neutral wire 20. The latter is more likely to happen in those localities where it is required that the neutral wire be grounded at the meter, as indicated at 23, and the line is struck by lightning. Whatever the cause of the surge, if it is of sufficient magnitude and occurs in a wire or winding closely adjacent the meter, it is likely to cause a change in the strength of the permanent damping magnet system 15. In most instances, such surges cause more or less demagnetization of the permanent magnets. This destroys the calibration of the meter and thereafter, until the mischief is discovered and corrected, the meter runs too fast. Permanent magnets such as those used in meters, are, prior to their use, partially demagnetized and aged to make them as immune as practicable to changes during their useful life. In some meters, but not in all, there is provided a magnetic shield such as shown at 16 between the electromagnetic driving system and the drag magnets. Such a shield is helpful in preventing intense magnetic fields set up by reason of surge currents from changing the permanent magnets. However, in spite of these usual precautions, there occasionally occurs a surge of such intensity and character as to modify the strength of the permanent magnets. With ordinary present-day meters using chrome drag meters, about 4,000 amperes will give the meter an error.

The present invention provides simple means for indicating when such a harmful surge has occurred, in order that the meter or its drag magnets may be replaced promptly or else recalibrated and made accurate.

In the meter, such as shown in Fig. 1, this indicating means may take the form of one or more tiny permanent magnets which are normally held by their own permanent magnet strength to the magnetic shield 16 or to some other magnetic part located preferably between the source of the surge flux and drag magnets. An enlarged view of one of these indicator permanent magnets is shown in Fig. 1a. Their exact size and shape is not important. They should, however, be sufficiently small and magnetically segregated from the meter armature as to have no influence one way or another on the meter calibration. The bottom of the magnetic shield 16 of Fig. 1 is horizontal as represented in front view of Fig. 2 and the magnet or magnets 24 and 25 are merely held thereto by their own magnetism, as represented by the magnet 24 of Fig. 1. If, now, a surge occurs of such magnitude and direction as to produce a demagnetizing field on one or more of the permanent magnets 24, 25 hanging on the shield, such magnets will drop off and come to rest in the bottom of the glass case, as shown at 25. This is an indication that a surge has occurred. The polarized bar may be seen through the glass cover from the front of the meter in both its attracted and released positions. The surge may be in either direction or it may be oscillatory. If, then we have two magnets 24 and 25 clinging to the shield 16, they should preferably be reversed, i. e. one with its north pole against the shield and the other with its south pole against the shield. A surge in one direction will tend to demagnetize one, and a surge in the opposite direction will tend to demagnetize the other. Hence, if a serious surge occurs in either direction, one magnet will drop to the indicating position. If the surge is oscillatory and of sufficient magnitude in both directions, possibly both magnets will drop. In using the expression "demagnetizing" in referring to the force which causes the small permanent magnets to drop off, I use it in the broad sense. Actually, in the form of the invention shown in Figs. 1, 2 and 3, these small magnets may not be permanently demagnetized to any extent, but as soon as the surge has passed, sometimes they may be replaced on the shield and will cling thereto as before. On the other hand, if the surge is very severe, one of the small magnets may be completely recharged in a direction opposite its original charge. What generally happens with an arrangement like Fig. 1 is that the surge flux magnetizes the shield and makes its lower end either a positive or negative pole, and this repels that magnet which has its similar pole in contact with the shield.

The permanent magnets 24 and 25 will preferably be suspended with their magnetic axes parallel to the expected axis of surge flux. This will generally be parallel to the axes of the current winding or windings, although special meter constructions may alter this, but the usual major path of surge flux in a given meter can be determined by trial and the indicator magnet or magnets placed accordingly. In meters with which a neutral conductor is closely associated, it may also be advisable to determine the path of flux due to surges in the neutral conductor and, if different from that produced by surges in the current windings, additional permanent magnet indicators may be placed in such path. For instance, I may suspend a pair of indicator magnets on the shield 16 with their polarized axes reversed and horizontal as indicated in Fig. 2.

It now remains to calibrate the indicator magnet or magnets so that they will be demagnetized to the drop off point by surge fluxes which will permanently alter the strength of the permanent drag magnets 15 but so that they will not drop off to the indicating position when subjected to smaller surge fluxes. This calibration does not need to be exact, as surges which are at all likely to alter the strength of the permanent magnets are not of frequent occurrence. The shape, weight, location and coercive force of the indicator magnets can be altered to vary their clinging power and the extent to which they are influenced by a given surge flux. For example, a magnet of a given weight may be strengthened as a permanent magnet by making it longer and thinner. Its magnetic adhering strength can be decreased by providing it with a non-magnetic coating such as paint or paper of any selected thickness which will then provide an air gap between the magnet and shield 16. The magnet can be placed on the lower edge of shield 16 or on either side of shield 16 to vary the extent to which it will be demagnetized by a given surge flux originating in the current winding, for example. Permanent magnet materials of different coercive force and of different weights can be selected from a wide variety of available materials. The thickness and magnetic qualities of the shield 16 will have a bearing on the indicator to be selected. The coercive force material used in the permanent drag magnets 15 and the degree of original knock down will have a bearing on the indicator to be selected. The relative spacing of the current coil, shield, and drag magnet will change the conditions involved. Even the nature of the wiring and position of the current terminals of the meter will have some influence on the distribution of surge current fluxes. There are so many variables involved that it is unwise for one to merely hang any small permanent magnet on the shield and assume that he has arrived at the most suitable indicator arrangement for a given meter. Such procedure will, of course, produce a surge indication, but it is best to experiment with different kinds of indicator magnets and their locations with various kinds and magnitudes of surges to arrive at the best arrangement with each type of meter. One does not wish to have the indicator magnet drop to the indicating position for current surges that certainly will not cause any change in the drag magnet strength, since this, while effective in detecting current surges that will change the strength of the drag magnet or magnets, will also detect smaller surges and will result in unnecessary testing of the meter. It is only those current surges which will or are likely to change the strength of drag magnet or otherwise damage the meter that one is interested in indicating and hence the nearer one can approach to this ideal calibration condition, the more useful will be the indicator.

In Fig. 2 I have shown a face view of a watthour meter. The windings are hidden by the shield 16. I have here shown modified forms of indicators consisting of a small bar permanent magnet 26. The magnet 26 is suspended from the lower edge of the shield 16. If a surge occurs which magnetizes the shield so that a north pole of sufficient strength occurs at its bottom, the north pole of magnet 26 will be repelled and this will be sufficient to cause the magnet to drop to the indicating position indicated in dotted lines. If the damaging surge produces a south pole at the bottom of the shield, the south pole of the magnet 26 will be repelled with similar indicating results. Hence, a single magnet suffices for both types of surges.

Fig. 1 also shows the shield as having a relatively thin shelf 27 extending from its side from which a bar magnet 28 may be magnetically suspended in a horizontal direction. The idea here illustrated is that a large surge flux along a horizontal axis will saturate the thin section of shelf 27 and thus release magnet 28. Also, I may use an indicator magnet such as 28 with such low coercive force that the surge flux will demagnetize it and cause it to drop because of loss of permanent magnet strength.

In those forms of the invention where the indicator magnet drops to the bottom of the meter casing, I prefer to cover the magnets with a thin coating of insulating paint. If, then, they should accidentally come against the meter terminals, they will not cause a short circuit. The paint will preferably be of a color that is easily visible against the meter background.

Fig. 3 indicates a portion of a magnetic shield 16 to the lower edge of which an adjustable frame 29 is supported. Pivoted on this frame are two indicator magnets 30 and 31 having their free ends oppositely magnetized and positioned so as to be magnetically held against the lower end of shield 16 by magnetic attraction. In this condition the magnets are not quite vertical, hence surge flux repelling forces of the proper polarity will cause these indicators to drop to the position shown in dotted lines for magnet 30 and thus give an indication.

Fig. 4 shows another arrangement where two saturated magnets 32 and 33 have their upper ends of the same polarity and freely pivoted close to each other by the non-magnetic supporting ring 34. When properly magnetized the lower ends will be held apart by repulsion along a scale 35. A demagnetizing knock-down surge flux on either or both magnets will reduce the repelling force and cause the magnets to approach each other due to gravity. The scale may be calibrated so as to give an indication of the relative magnitude of the surge flux force in terms of its influence on the meter calibration. In this case the magnets 32 and 33 should be made of a relatively low coercive force material. The ring 34 is adjustable as to elevation and as to the horizontal direction of magnetic suspension.

Figs. 5 and 6 represent front and side views respectively of a preferred arrangement of my invention as applied to a single phase induction watthour meter at the present time manufactured by the General Electric Company. In this meter there is a bracket 36 extending towards the front from the bottom of the shield 16 for supporting the drag magnets 15. A clamp structure at 37 for holding the drag magnets 15 is slidably mounted on bracket 36 and held to the bracket when properly adjusted by a clamping screw 38. The shield 16 is in the form of a casting, is of magnetic material and serves as a supporting frame for various meter parts. The driving magnets are supported on its back and the register, meter bearings and drag magnets are supported from its front.

My indicator mechanism as applied to this meter includes an L-shaped member having slotted leg 39 and a permanent magnet leg 40 extending at right angles thereto parallel with the face of the shield 16. This L-shaped part is secured to the bottom of the shield or bracket by a screw 41 fitting through the slot in leg 39 so that this member as a whole may be adjusted forward and backward between the shield proper and the drag magnets. The part 39 is preferably spaced from the bottom of the shield framework 16 by a brass washer 41'. The arm 40 is a chrome steel permanent magnet magnetized with opposite poles at its two ends and constitutes the fixed seat for the drop off bar magnet 42. The drop off magnet 42 is also of chrome steel and is placed on magnet 40 so that opposite poles of the two magnets are adjacent each other and thus an attracting force is present which normally holds the drop off magnet in place. Preferably a brass ring 43 is threaded loosely through holes in adjacent ends of the two magnets 40 and 42 in order that the drop off magnet 42 will not find its way to the meter terminals, for example, when it drops off. Thus, the brass ring allows the magnet 42 to drop to the indicating position shown in dotted lines in Fig. 5 when a detrimental surge occurs. The front of the drop off magnet may be provided with a paper tab 44 which may carry advertising matter or some identification number and aids in the visibility of the position of this small magnet. This, however, is not essential but if to be present the slight added weight thereof should be taken into consideration in the calibration of the device. The operation of this device is based on the fact that a harmful surge flux will reverse the polarity of one of the magnets and repel the drop off magnet, and cause it to fall to the indicating position.

This device built to the dimensions shown and with the meter proportions shown is suitable for indicating surge fluxes that will probably partially demagnetize the drag magnets when they are the customary chrome steel magnets heretofore used on such meters. It is obvious that adjustment of the indicator magnets towards the current coil and away from the drag magnets will make the device more sensitive, i. e. the indicator will operate for lower current surges. Hence, there is provided a sufficient range of adjustment to meet the requirements of practical device and a device that may be made in quantities at small expense and for application to existing meters.

Since it is customary for meter readers to visit such meters once per month, the meter reader can readily note the position of the surge indicator and thus promptly report any meters on which a harmful surge has occurred. The meter may then be promptly tested and replaced if necessary. Otherwise, the meter may remain inaccurate until the next routine test occurs, which is generally made once in three years.

In some installations of conduit meters, as illustrated in Figs. 1 and 2, where the service wires are placed in steel or iron conduits 9 leading to the meter and especially where the conduit contains a grounded neutral wire such as the wire 20, Fig. 1, I may provide my permanent magnet indicator arrangement on the conduit adjacent the meter. This may take the place of the other forms of indicators shown or it may be used as an additional indicator. The conduit 9 is provided with a spacer block 45 made of some material such as rubber, wood, or porcelain, etc. On the front side of such block where it is visible is fastened a small permanent bar magnet 46 with its long axis at right angles to the direction in which the conduit runs. Held to the magnet 46 by magnetic attraction is a second bar magnet 47 which is a drop off indicator magnet as explained in the arrangement of Figs. 5 and 6. Magnets 46 and 47 are oppositely magnetized. That is, the north and south poles of the different magnets are opposite each other so that the magnets will attract each other.

In case of a predetermined surge current in any cable contained in the conduit, as for example a lightning surge to ground through the neutral wire, a flux will be set up in the iron conduit about the cable and if the surge is sufficient, flux will be diverted out to the permanent magnets 46 and 47 and also to the meter drag magnets 15. If such surge flux is sufficient, it will reverse the polarity of one of the magnets 46 or 47 and cause magnet 47 to be repelled and it will drop to the position indicated in Fig. 2. A string or brass wire 48 may be provided to prevent magnet 47 from being lost. It is intended that any surge flux that will partially demagnetize either or both of the meter drag magnets will also produce the indication described. I have found that using a one inch steel conduit, the magnet 46 should be spaced about one-half inch from the outer edge of the conduit.

My invention is generally applicable to any electrical metering device (direct or alternating current) which makes use of one or more permanent magnets where such magnets must remain at the same strength for metering accuracy. It may also be useful for indicating surge conditions for other reasons than the weakening of permanent magnets. For example, in Figs. 7 and 8 I have shown different views of a transmission line cable 50, its supporting insulator 51 and cross arm support 52. One or more of my indicators may be fastened to the cross arm support 52 at different distances from cable 50 to indicate the presence and approximate magnitude of unusual surge currents in the conductor. The indicator shown is substantially like that previously explained in connection with Figs. 5 and 6 having bar magnet 40 fixed to the cross arm 52 and a reversely magnetized drop off magnet 42 having a visible tab 44 thereon which may be marked at the approximate current range at which the indicator will drop off. The indicator or indicators will preferably be housed to protect them from dirt and storm conditions by a casing 53 having a glass observation window cover 54. If the indicators are alike the one closest to cable 44 will drop off first or for current surges lower than that necessary to operate indicators farther from the cable. Hence, the tabs may be marked with the current surge values that will cause them to indicate and thus provide a visible indication that surges of certain values have or have not occurred.

In the drawings the 50,000 ampere surge indicator has operated but the 75,000 ampere surge indicator has not operated. In most cases the magnets comprising the stationary and movable parts of the indicator may be made of sufficiently thin material that they are little influenced by the steepness of the wave front of the surge. If, however, it is desirable to have the indicators selective to the time constants of the surges, they may be made thicker and certain ones laminated. A steep wave front surge will have less effect on the thick unlaminated magnet because of the tendency of eddy currents therein to prevent flux changes.

Hence for certain applications of my invention, I contemplate that it may be desirable that the permanent magnets of certain indicators be laminated.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

In any large metering installation where it is important that the error caused by a surge shall be detected and corrected at once, the indicator of my invention can be used to actuate an alarm circuit when it operates. One way of doing this is illustrated in Fig. 5 where the small switch 55 is arranged to be closed when indicator member 42 is released and dropped.

What I claim as new and desire to secure by Letters Patent of the United States is:

1. In combination, an induction watthour meter having electromagnet energizing means, a rotary armature of conducting material, permanent magnet means for producing a damping flux through said armature, a magnetic shield between the energizing means and said permanent magnet damping means, a bracket extending from the lower part of said shield for supporting the permanent magnet damping means, a polarized magnetic bar magnetically spaced from and secured to the lower part of said shield and adjustable towards and away from the permanent magnet damping means, a polarized magnetic drop-off bar normally held to the first bar by magnetic attraction but adapted to drop by gravity when released, said bars being designed to be released in response to abnormal surge fluxes in the meter which are of such character as likely to cause alteration in the strength of the permanent magnet damping means, and a glass cover for said meter, said drop-off bar being observable through said glass cover in both its attracted and released positions.

2. In combination, an electric integrating meter having a stationary energizing circuit, a rotary member of conducting material and permanent magnet means for producing a damping flux through said rotary member, and means for producing an indication whenever said permanent magnet damping means is subjected to a surge flux of such character as is likely to cause alteration in its strength, said means comprising a bar permanent magnet adjustably secured to a stationary part of the meter between the stationary energizing circuit and the permanent magnet damping means and a second bar permanent magnet which is normally held to the first mentioned bar magnet by magnetic attraction and which, when released, will drop by gravity to a different position to produce an indication, said two bar magnets being positioned, designed and magnetized so that normally their fluxes will have no influence on the operation of the meter but where they will be subject to surge fluxes which are likely to influence the permanent magnet damping means and to produce the aforesaid indication only in response to surge fluxes which are likely to alter the strength of the permanent magnet damping means.

WILLIAM D. HALL.